3,120,561
PRODUCTION OF TEREPHTHALIC ACID

Remy Fernand Chambret, Lyon, France, assignor to Societe Rhodiaceta, Paris, France, a French body corporate
No Drawing. Filed Jan. 17, 1958, Ser. No. 709,716
Claims priority, application France Feb. 8, 1957
2 Claims. (Cl. 260—515)

This invention relates to the production of terephthalic acid from polymethylene terephthalates.

In the manufacture of artificial fibres from polyethylene terephthalate a certain amount of waste polyethylene terephthalate in fibre and other forms is inevitably produced, and it is, in practice, desirable to regenerate from it the monomeric components, and especially the terephthalic acid. Known methods for doing this are hydrolysis with the aid of an acid or alkali, and alcoholysis by means of a dihydric alcohol or a monohydric alcohol such as ethanol, in the presence or absence of a catalyst.

These methods suffer from various disadvantages. Thus, the immediate product of an alkaline hydrolysis is a salt, from which the terephthalic acid must be liberated by means of a mineral acid; in practice the resulting precipitate of terephthalic acid is always contaminated with the mineral acid, from which it must subsequently be purified. Moreover, the terephthalic acid precipitates in the form of fine crystals which are not easy to filter off or to wash. The terephthalic acid resulting from an acid hydrolysis also has to be purified from mineral acid.

Alcoholysis, on the other hand, has the disadvantages of requiring the use of large quantities of an alcohol, usually methanol, which is a relatively costly reagent, and of giving the terephthalic acid in the form of a diester which must be given a further hydrolysis if free terephthalic acid is required; this is particularly disadvantageous in view of the present tendency to make use of the direct esterification of terephthalic acid with a glycol in the manufacture of polymethylene terephthalates, instead of the previously favoured ester-interchange reaction between a glycol and dimethyl terephthalate.

It is an object of the present invention to provide a method of producing free terephthalic acid from polymethylene terephthalates that shall be free from these disadvantages.

According to the invention terephthalic acid is produced by a process which comprises hydrolysing a polymethylene terephthalate by means of water which is substantially free from acids and alkalis and which is at a temperature above 200° C. The use of temperatures above the normal boiling point means, of course, that the reaction is effected under pressure. It is found that under these conditions polymethylene terephthalates can effectively be hydrolysed into the component dihydric alcohol and free terephthalic acid even though no catalyst is present, and in addition that a very pure terephthalic acid can be obtained. Moreover, the terephthalic acid can be obtained as crystals having dimensions of about 500–1000µ x 100–300µ, i.e. some 50 times larger than those obtained by acidifying a salt of terephthalic acid formed by alkaline hydrolysis, and much easier to filter off and to wash.

Preferably the hydrolysis is carried out at a temperature between about 230° and 250° C.; at these temperatures the hydrolysis proceeds fairly quickly, requiring generally about 4 hours at 230° C. or 3 hours at 250° C., and giving a yield of terephthalic acid in the neighbourhood of 95%. At lower temperatures not only is the reaction slower, but the yields obtainable are less good. Temperatures above 250° C. can be used, but no advantage is gained thereby commensurate with the expense of providing equipment to stand up to the higher pressures developed.

At the conclusion of the hydrolysis the reaction mixture is cooled, after which the terephthalic acid formed can be separated, e.g. by filtration. The separation of the terephthalic acid is preferably carried out at a temperature of about 80° C. since at this temperature the small amount, usually about 1%, of low polymer that may remain does not precipitate. Before the separation the reactants may with advantage be allowed to stand at about the boiling temperature for some time. The liquor remaining after the separation of the terephthalic acid may be treated to recover the ethylene glycol or other dihydric alcohol component of the polymethylene terephthalate.

The invention is illustrated by the following example.

Example

Polyehylene terephthalate in the form of spinning waste containing 0.5% of titanium dioxide is introduced into a stainless steel autoclave provided with an anchor-type stirrer, together with 7.65 times its weight of water. The temperature is raised during a period of 35 minutes to 240° C.; the stirrer is then started, and heating continued until the temperature has reached 250° C. This level is maintained for 3 hours, after which the temperature is allowed to fall during 2 hours, stirring being continued throughout.

The reaction mixture is then kept at about the boiling point under atmospheric pressure for 1 hour, after which it is filtered at 80° C. The terephthalic acid residue, after being washed and dried, is obtained with a degree of purity of 98–99% and in amout 81% of the weight of the polyethylene terephthalate.

I claim:

1. Process for the production of terephthalic acid from a polyethylene terephthalate, which comprises heating a reaction mixture consisting essentially of polyethylene terephthalate and water at a temperature of 230–250° C. to bring about hydrolysis into ethylene glycol and terephthalic acid.

2. Process according to claim 1, which comprises also the step of separating the precipitated terephthalic acid from the reaction mixture at a temperature of about 80° C.

References Cited in the file of this patent
UNITED STATES PATENTS
2,793,235    Jenkinson _____ May 21, 1957
FOREIGN PATENTS
610,135    Great Britain _____ Oct. 12, 1948
OTHER REFERENCES
Groggins: Unit Processes in Organic Synthesis, 4th ed., pages 651–654 (1952).